US007954771B2

(12) United States Patent
Paulig

(10) Patent No.: US 7,954,771 B2
(45) Date of Patent: Jun. 7, 2011

(54) SPRINKLER MOUNT

(75) Inventor: Gerd Paulig, Oelbronn-Duerrn (DE)

(73) Assignee: Witzenmann GmbH, Pforzheim (DE)

( * ) Notice: Subject to any disclaimer, the term of this patent is extended or adjusted under 35 U.S.C. 154(b) by 238 days.

(21) Appl. No.: 11/764,103

(22) Filed: Jun. 15, 2007

(65) Prior Publication Data

US 2007/0290101 A1 Dec. 20, 2007

Related U.S. Application Data

(60) Provisional application No. 60/818,994, filed on Jul. 7, 2006.

(30) Foreign Application Priority Data

Jun. 16, 2006 (DE) .................... 20 2006 009 429 U

(51) Int. Cl.

| | |
|---|---|
| ***F16L 3/24*** | (2006.01) |
| ***F16L 3/00*** | (2006.01) |
| ***A62C 35/00*** | (2006.01) |
| ***A62C 37/08*** | (2006.01) |
| ***G09F 7/18*** | (2006.01) |

(52) U.S. Cl. ............. 248/72; 248/62; 248/75; 248/343; 169/16; 169/37; 52/39; 52/220.6; 52/506.07

(58) Field of Classification Search .................... 169/16, 169/5, 6, 7, 8, 13, 17, 29, 37, 41; 248/65, 248/72, 227.4, 300, 201, 906, 342, 343, 200.1, 248/62, 75, 48.1, 74.1; 52/712, 28, 39, 506.07, 52/220.6, 506.06, 506.08; 24/292, 295, 563; 403/326, 327, 187, 188, 279, 282, 329, 397, 403/398, 399, 403, 382, 231, 346
See application file for complete search history.

(56) References Cited

U.S. PATENT DOCUMENTS

| | | | | |
|---|---|---|---|---|
| 3,341,909 | A * | 9/1967 | Havener | 24/486 |
| 4,068,359 | A * | 1/1978 | Bunker | 29/33 K |
| 6,158,519 | A * | 12/2000 | Kretschmer | 169/16 |
| 6,341,466 | B1 * | 1/2002 | Kehoe et al. | 52/712 |
| 7,032,680 | B2 * | 4/2006 | MacDonald et al. | 169/43 |
| 7,240,884 | B2 * | 7/2007 | Shim | 248/342 |
| 7,427,051 | B2 * | 9/2008 | Oh | 248/73 |

(Continued)

FOREIGN PATENT DOCUMENTS

DE 197 09 916 C1 6/1998

(Continued)

OTHER PUBLICATIONS

German Search Report dated Sep. 19, 2006 with English Translation of relevant portion (Nine (9) pages).

(Continued)

*Primary Examiner* — Dinh Q Nguyen
*Assistant Examiner* — Justin Jonaitis
(74) *Attorney, Agent, or Firm* — Crowell & Moring LLP

(57) ABSTRACT

A mount for situating a sprinkler nozzle of a fire extinguishing system in an opening of a suspended ceiling system, the fire extinguishing system having a main line to which a downwardly directed sprinkler nozzle is connected by a flexible hose line, a bridge provided on the top side of the ceiling system extending essentially parallel thereto, the bridge being connected to girders of the ceiling system by a detachable clamp, and the sprinkler nozzle being at least indirectly attached to the bridge.

12 Claims, 15 Drawing Sheets

U.S. PATENT DOCUMENTS

| | | | | |
|---|---|---|---|---|
| 7,506,845 | B2 * | 3/2009 | Oh | 248/73 |
| 2002/0066834 | A1 | 6/2002 | Choi | |

FOREIGN PATENT DOCUMENTS

| | | | |
|---|---|---|---|
| EP | 1 695 744 | A2 | 2/2006 |
| JP | 6-261956 | A | 9/1994 |
| JP | 7-4567 | A | 1/1995 |
| JP | 7-151269 | A | 6/1996 |
| JP | 9-655 | A | 1/1997 |
| WO | WO 02/078789 | A1 | 10/2002 |

OTHER PUBLICATIONS

European Search Report dated Oct. 10, 2007 with an English translation of the pertinent portions (Eight (8) pages).

* cited by examiner

SPRINKLER MOUNT

CROSS REFERENCE TO RELATED APPLICATIONS

This application claims priority from U.S. provisional patent application No. 60/818,994, filed Jul. 7, 2006. Priority is also claimed based on Federal Republic of Germany patent application no. DE 20 2006 009 429.6, filed Jun. 16, 2006.

BACKGROUND OF THE INVENTION

The present invention relates to a mount for situating a sprinkler nozzle of a fire extinguishing system in an opening of a suspended ceiling system.

A wide variety of mounts for sprinkler nozzles are known in the art. For example, published German patent application no. DE 197 09 916 discloses a bridge comprised of a folded sheet-metal blank and fastened via connection elements, which also comprise a sheet-metal blank, to two girders, by inserting the connection elements into slots of the girder. The connection elements are screwed together with the sheet-metal blank in this state and they thus fix the bridge having the sprinkler nozzle attached thereto to two girders in a formfitting way.

In addition, a sprinkler mount is known from US-A 2002/066834, in which the bridge comprises a rectangular tube and is fixed to two girders running parallel to one another using a clamp, the clamp having a fastener to apply force to the bridge and at least one further fastener for clamping the clamp in relation to the girder. While the rectangular tube of US 2002/066834 has advantages in relation to the above folded sheet-metal blank for use as a bridge, because it is more stable, torsion resistant, and cost-effective, the disadvantages of the subject matter of US-A-2002/066834 are that the clamp must ensure the mutual fixing of bridge and girder via two or even three fasteners. This is disadvantageous above all if the position of the bridge must be changed or the bridge must even be removed entirely on location when the suspended ceiling system has already been mounted, because between two and six fasteners must be loosened for this purpose and subsequently tightened again. In addition, when the bridge is mounted, some of the fasteners are even covered by the girder or bridge and are thus difficult to access.

Further disadvantages exist in the subject matter of DE-A-197 09 916 because the mount may only be used with those girders which have the desired slotted recesses. In a similar way, the mount known from US-A-2002/066834 is also usable only for one type of girder, because the clamp must be tailored to a specific girder type to be able to fix the clamp to the girder using an associated fastener, while another fastener ensures the clamp is fixed to the bridge.

SUMMARY OF THE INVENTION

Proceeding therefrom, it is an object of the present invention to provide a sprinkler mount of the aforementioned type, which is characterized by a simple and cost-effective construction.

Another object of the invention is to provide a sprinkler mount which is simple and convenient to handle and install.

A further object of the invention is to provide a sprinkler mount which can be advantageously used with different types of ceiling girders.

These and other objects are achieved in accordance with the present invention by providing a mount for situating a sprinkler nozzle of a fire extinction system in an opening of a suspended ceiling system with the sprinkler nozzle directed vertically downwardly and connected to a main water line of the fire extinguishing system, the mount comprising a bridge member to which the sprinkler nozzle is at least indirectly attached, the bridge member being disposed on top of the ceiling system extending essentially parallel thereto and being connected to at least one girder of the ceiling system by a removable clamping device, wherein the clamping device comprises a clamp which at least partially encloses both the girder and the bridge member, the clamp comprising a fastener which urges the bridge member and the girder against one another and thereby fixes the bridge member and girder to one another in a form-fitting manner.

In a further aspect of the invention it is an object of the invention to provide an improved device for attaching a sprinkler nozzle to a sprinkler mount.

This and other objects are achieved by providing a device for attaching a sprinkler nozzle to a sprinkler mount as described above in which the nozzle is connected via a flexible hose line to a fire extinguishing system, and the device comprises a sleeve situated between the hose line and the sprinkler nozzle, and a clamp which encloses the sleeve on one side and the mount on the other side.

According to the invention, the device for affixing the bridge member to a ceiling girder comprises a clamp which at least partially encloses both the girder and also the bridge member, and the clamp urges the bridge and the girder against one another via a common or shared fastener and thus fixes them to one another in a formfitting way.

Typically, the fire extinguishing system will comprise a main line to which the downwardly directed sprinkler nozzle is connected via a flexible hose line, a bridge provided on the top side of the ceiling system connected to the girders of the ceiling system and running essentially parallel thereto, the bridge and girder being connected in each case via a detachable clamp device, and the sprinkler nozzle being at least indirectly attached to the bridge.

The fastener is constructed for this purpose in such a way that it ensures both the fixing of the clamp on the bridge and also the clamp on the girder and thus fixing of the bridge on the girder.

For this purpose, it is recommended that the bridge comprise a rectangular tube, as is known, for example, from US-A 2002/066834. Tubes of this type have proven themselves in regard to simplicity, stability, and cost-effectiveness.

In regard to the girder, it is typical if it comprises a lower horizontal T-base and a head profile, referred to in the following as a flange or enlarged flange, which is enclosed by the clamp. In particular, the girder preferably comprises a T-girder having a head-side flange expanded in relation to the T-web, the clamp engaging underneath this flange. If the dimensions of the T-girder vary, the advantages according to the present invention come to bear, in that the clamp has two legs running essentially parallel and a shared clamp base, which carries the screw fasteners, and the legs are constructed as hooked on their free ends, so that the clamp encloses the girder and/or the bridge using the hooked free ends. In this way, it is possible to slip the clamp over the girder, so that one leg is situated on one side and the other leg is situated on the other side of the bridge, and afterward the clamp is pivoted around its vertical axis so that the deflected hook-shaped ends of the legs extend under the enlarged flange of the T-girder and thereby engage underneath the T-flange. If the fastener, which particularly comprises a screw fastener or a wedge or other clamping device, which may ensure a vertical adjustment movement, is now tightened, the hook-shaped free ends of the clamp pulls the T-girder flange toward the bridge member, which in turn functions as a counter member for the clamp and is subjected to clamping force by the fastener of the clamp, i.e., in particular by a screw fastener.

If the fastener fixed on the clamp comprises a screw, it may be recognized without difficulty that variations in the height of the particular flange may be compensated for and absorbed without problems via the length of the screw, so that the mount according to the present invention may also be used for different flange heights. The hooked ends of the clamp only need to enclose the T-flange of the T-girder for this purpose.

The connection of bridge on one side and girder or girder flange on the other side, which typically run perpendicularly to one another, is made possible in that the clamp legs in the area of their hooked ends are spaced apart a horizontal distance which is somewhat greater than the width of the T-flange. In this way, it is ensured that after the clamp is pushed over the bridge and the flange of the girder, the clamp may subsequently be pivoted until the hooked ends engage underneath the flange. If the clamp is then tightened via the fastener, the hooked ends operably engage the flange of the girder and press it tightly against the bridge member and/or one end of the bridge.

The bridge member and the girder extend in a known manner in the same plane or at least in horizontal planes approximately parallel to one another, and the bridge and the girder also are oriented essentially perpendicularly to one another, so that the bridge can be fastened at its ends to two girders running parallel to one another. The girders form a frame in which cassette-shaped ceiling elements may be inserted, and the bridge is used for the purpose of positioning the sprinkler nozzle in such a way that it projects through an opening positioned approximately in the center of such a the ceiling element.

The sprinkler nozzle is fixed on the bridge by situating a sleeve between hose line and sprinkler nozzle, and fastening the sprinkler nozzle to the bridge by applying a clamping force to the sleeve using a clamp which encloses the sleeve on one side and the bridge on the other side. For this purpose, the clamp has two legs, each having a recess for the sleeve and a leg base connecting the two legs, which carries a fastener for applying clamping force to the bridge, which advantageously comprises two parallel screws which contact the bridge and are urged against the sleeve.

BRIEF DESCRIPTION OF THE DRAWINGS

The invention will be described in further detail hereinafter with reference to illustrative preferred embodiments shown in the accompanying drawing figures, in which:

FIGS. 1 through 4 each share the feature that they show a front view in the view a), a side view in the view b), and a partially sectional view or a top view in the view c). When like components are used, such as the girder 3 and the bridge 4, they are identified by the same reference numerals.

DETAILED DESCRIPTION OF PREFERRED EMBODIMENTS

Figure 1A:
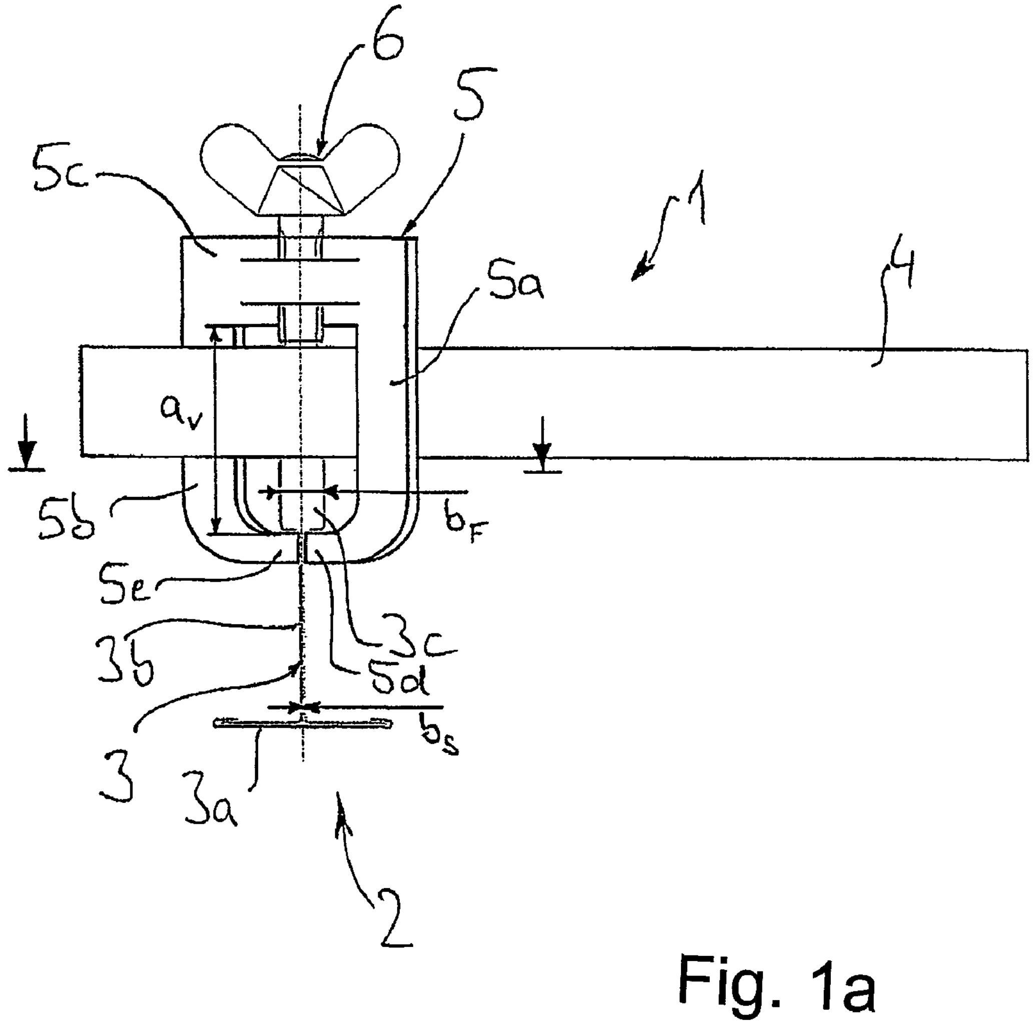
FIGS. 1*a*, 1*b* and 1*c* show a first embodiment of a sprinkler nozzle mount according to the present invention.

FIG. 1 shows a mount 1 for a ceiling system 2. The ceiling system comprises a plurality of girders 3, which form a latticed structure made of multiple girders situated perpendicularly to one another. In general, the girders have an inverted T-profile, in which individual cassette-shaped ceiling elements (not shown) are fixed in a known manner on the lower T-base 3*a* in FIG. 1. A vertical T-web 3*b* of the T-girder 3 extends upward starting from the horizontal T-base 3*a* and ends there in an enlarged flange 3*c*, which has an increased width in relation to the T-web 3*b* and thus receives the clamping force of the mounting clamp 1 as described in greater detail hereinafter.

The mount 1 essentially comprises a bridge member 4 in the form of a rectangular tube, which extends between two T-girders 3 and is fixed thereon. In a section not shown in FIG. 1, the bridge 4 carries a nozzle clamp which fixes a sprinkler nozzle (also not shown) precisely in position in such a way that the sprinkler nozzle projects through an opening provided in the cassette-like ceiling element. Various configurations and constructions for mounting the sprinkler nozzle are known in the art, so this will not be discussed in further detail here.

An important aspect of the invention is that the mount 1 also comprises a clamp 5, which has two vertical clamp legs 5*a*, 5*b* and a clamp base 5*c* connecting the two clamp legs. The clamp legs 5*a*, 5*b* have free ends 5*d*, 5*e* constructed as deflected or curved toward one another in a hook shape, and form retaining areas, which engage the T-girder 3 in the area below the flange 3*c* in such a way that the retaining areas of the clamp 5 press against the transition area from the T-web 3*b* into the T-flange 3*c*.

A vertically oriented screw 6, e.g., a manually operable wing screw, is situated in the area of the clamp base 5*c*. Screw 6 exerts a clamping force against the top side of the bridge member 4, and when further tightened the screw 6 clamps the bridge member 4 against a counter member formed by the free ends 5*d*, 5*e* of the clamp legs 5*a* and 5*b*. Thus, the clamp 5 encloses the bridge 4 on one side and the T-flange 3*c* of the T-girder 3 on the other side and fixes one against the other in a form-fitting or interlocked manner.

Figure 1B:
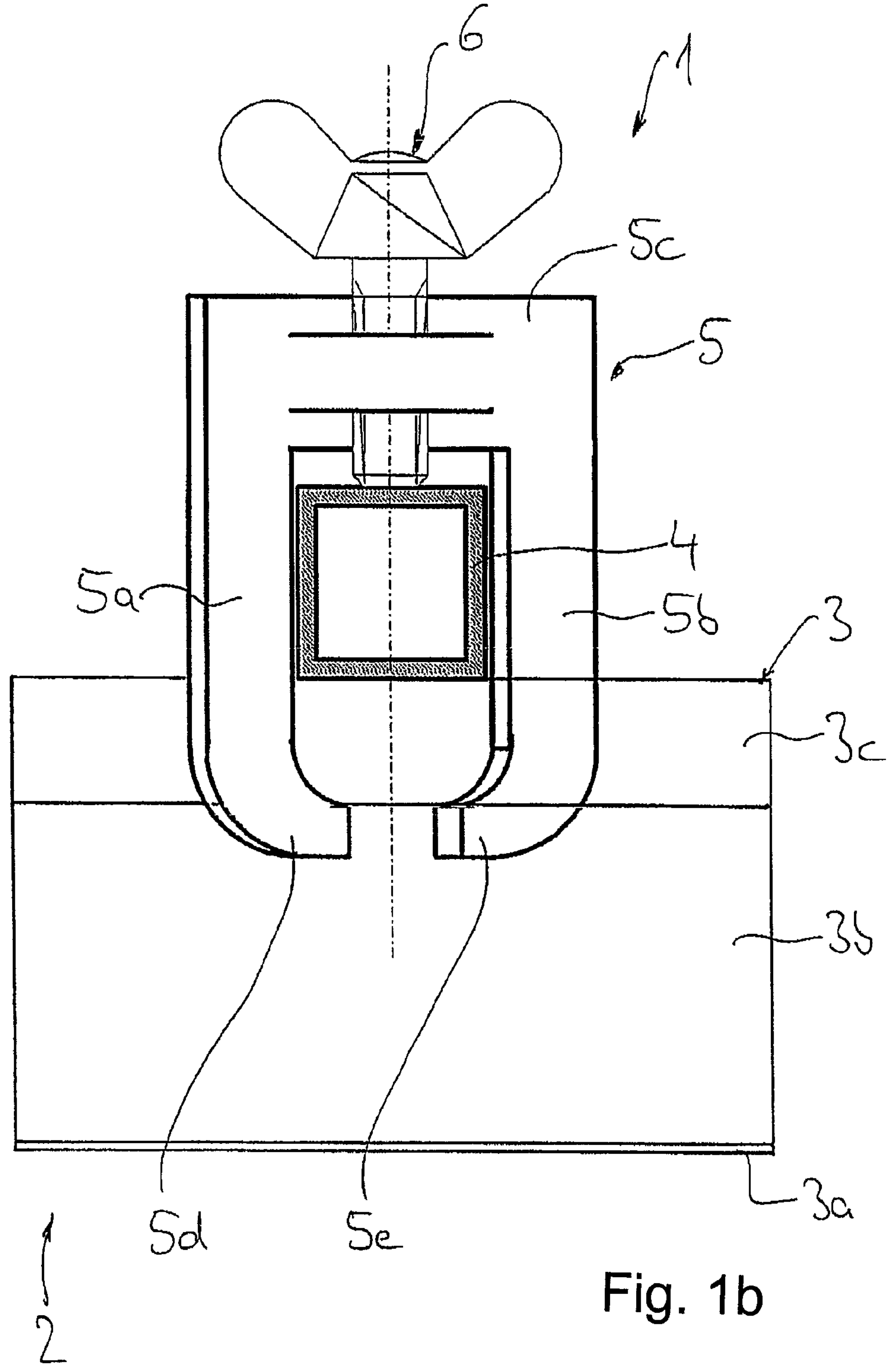
Figure 1C:
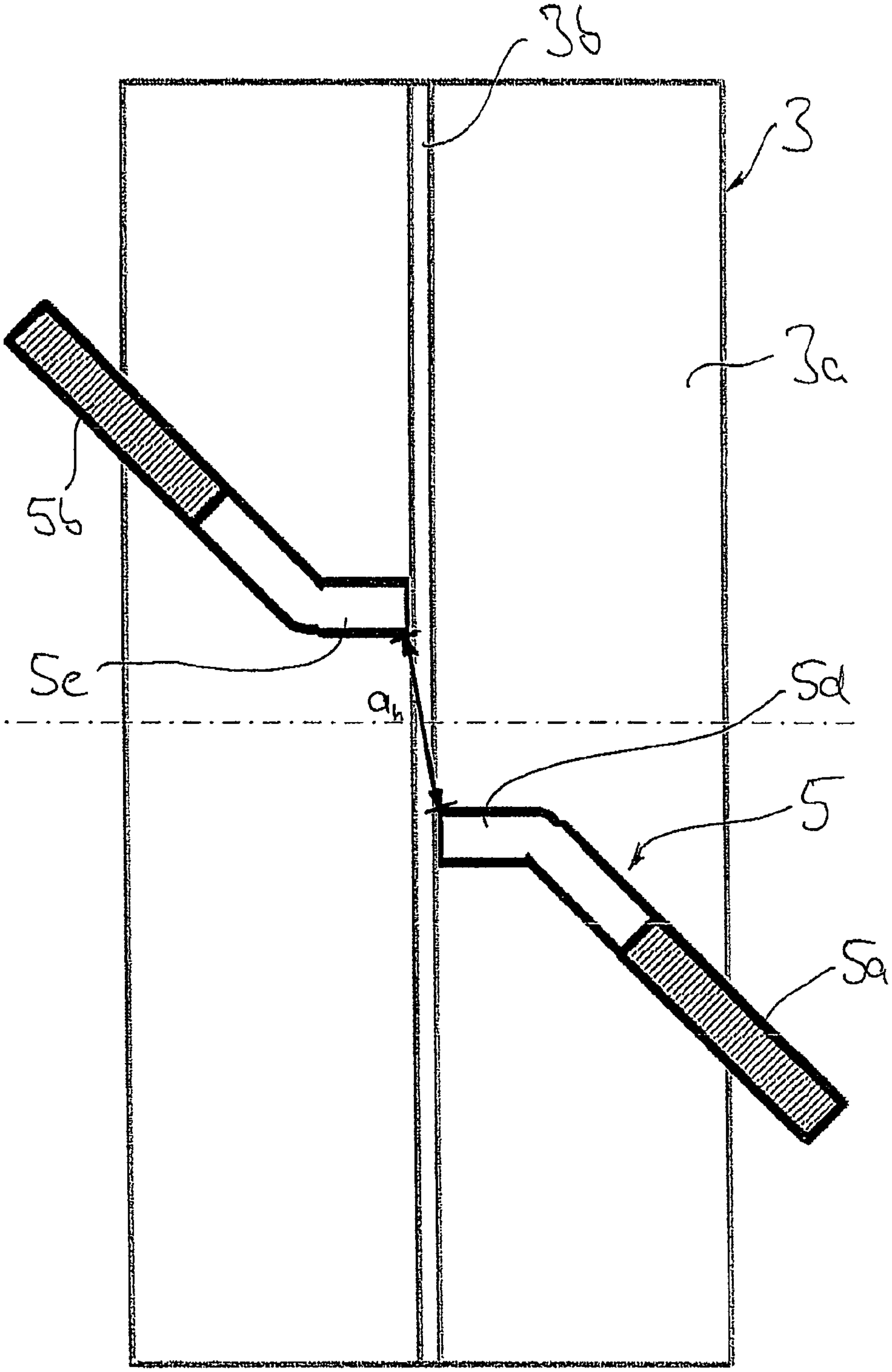

An important aspect of the clamp 5 is apparent from FIG. 1*c* in which the free ends 5*d*, 5*e* of the clamp legs 5*a*, 5*b* are shown in a sectional view from above. From this view it can be seen that the clamp merely comprises a flat sheet-metal blank which engages the T-flange 3*c* in such a way that the clamp is first put on the girder 3 and subsequently rotated (approximately 20°) around its vertical axis until the hook-shaped free ends 5*d*, 5*e* of the clamp legs 5*a*, 5*b*, which are bent somewhat away from the vertical plane, lie under the flange 3*c*. If the rectangular tube of the bridge 4 is subsequently inserted and the screw 6 is tightened, the inclined clamp 5 ensures the T-girder and bridge are clamped against each other.

It is possible to loosen this connection in the reverse sequence by loosening the screw, pushing out the bridge member, and pivoting the clamp back around its vertical axis until the distance between the free hooked ends 5*d*, 5*e* of the clamp legs is large enough that the clamp disengages from the T-flange 3*c* and may be lifted off of the T-girder.

FIG. 1*b* shows the clamp 5, the bridge member 4, and the T-girder 3 in a side view of FIG. 1*a*.

In FIG. 1*a*, a vertical distance $a_v$ between the upper edge of the hooked free end 5*d* and the lower edge of the clamp base 5*c* is shown. Of course, this vertical distance has to be at least as great as the vertical height of the bridge 4 and the T-flange 3*c* added together. If one wishes to provide a clamp which is usable for various girder types, it is advantageous to select the distance $a_v$ as large enough that space remains for the common head-side flange heights of between 4 mm and 15 mm, common bridge member heights also having to be taken into consideration. It is thus an advantage of the present invention that it provides a mount which may be used for different ceiling girder systems having varying heights by utilizing a clamp having a sufficient distance $a_v$ between the clamp base and the hook-shaped free ends of the clamp legs. If the vertical distance $a_v$ is dimensioned comparatively large, then to adapt the clamp to various girder heights, it is only necessary that the fastener (e.g., the screw 6 in FIG. 1), be sufficiently large to extend across any free space between the clamp base and the top side of the bridge member 4 resting on top of the girder 3.

It should be noted in this context that the flange width $b_F$ shown in FIG. 1*a*, has to be taken into consideration in determining the dimension of the horizontal spacing distance $a_h$ between the hook-shaped free ends 5*d*, 5*e* shown in FIG. 1*c*. For this purpose, the distance $a_h$ must be greater than the width $b_F$ of the T-flange 3*c* to allow the clamp to be inserted over the T-flange of the girder 3. After the claim is inserted around the enlarged flange of the girder 3, it is secured to the T-flange as described above by pivoting the clamp (by approximately 20° in the illustrative embodiment from FIG. 1*a*) until both free ends 5*d*, 5*e* engage underneath the T-flange 3*c*.

Figure 2A:
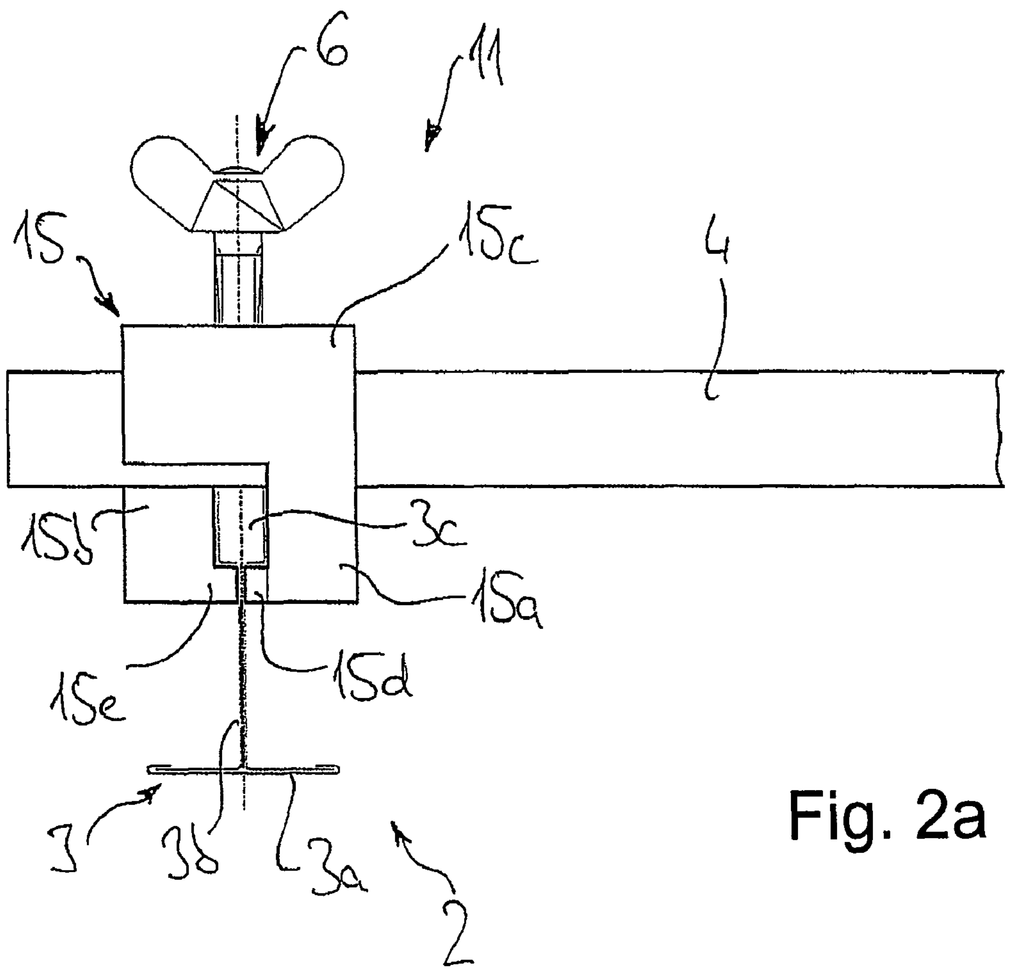
FIGS. 2*a*, 2*b* and 2*c* show an alternative sprinkler nozzle mount embodiment according to the invention.
Figure 2B:
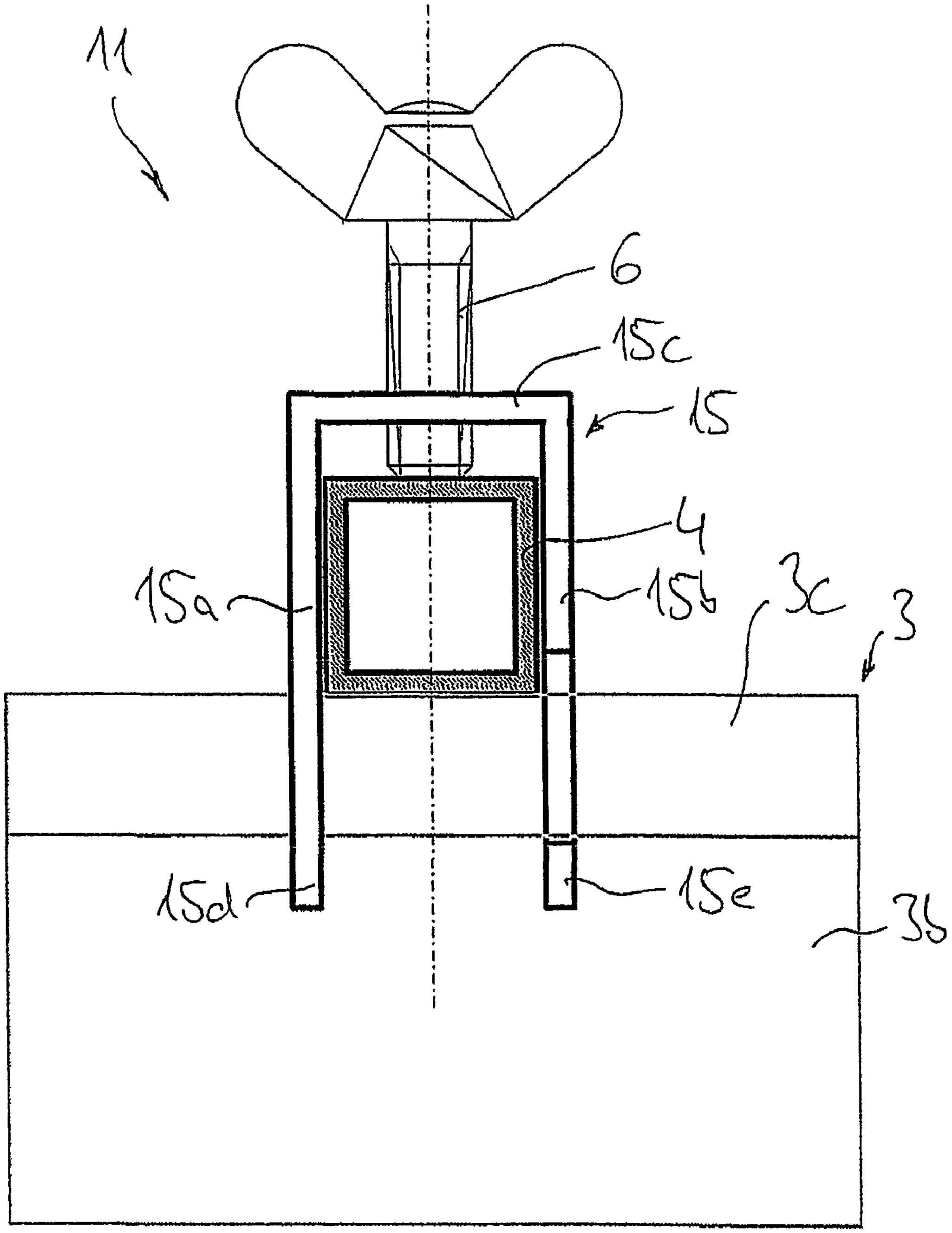
Figure 2C:
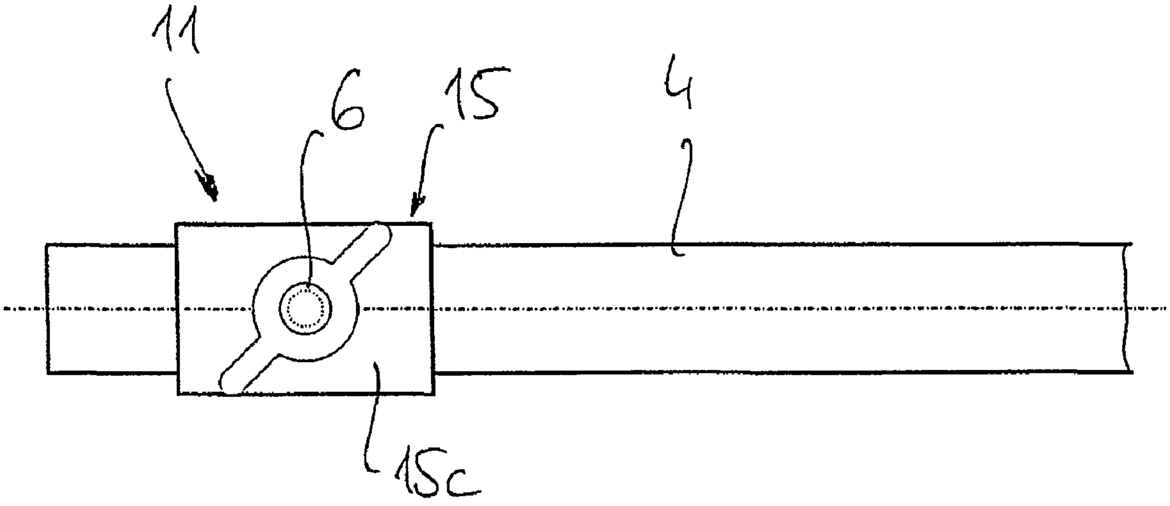

FIGS. 2*a*, 2*b* and 2*c* show views of a mount 11 comprising a clamp 15, which applies a clamping force to the same bridge 4 and the same T-girder 3 using the same screw fastener 6. However, in contrast to the clamp 5 of FIG. 1, the clamp 15 does not have a level, flat construction, but rather a construction as a U-profile, which is almost cuboid overall, having two essentially L-shaped clamp legs 15*a*, 15*b*, in which the free ends 15*d*, 15*e* are also constructed hooked and enclose and engage underneath the T-flange 3*c* in a manner similar to the hooked free ends 5*d*, 5*e* of the clamp 5.

It is possible to put the clamp 15 onto the T-flange 3*c* of the girder 3 in a manner similar to the clamp 5 of FIG. 1 in that the clamp 15 is oriented at an angle such that the distance between the two hooked ends 15*d*, 15*e* is greater than the width of the T-flange 3*c*, after which the clamp 15 may be inserted over the T-flange 3*c*. When the clamp is to be lifted off the girder, the clamp is pivoted in the reverse direction until the free hooked ends 15*d*, 15*e* of the clamp 15 no longer contact the T-web 3*b* and no longer engage underneath the T-flange 3*c*.

Figure 3A:
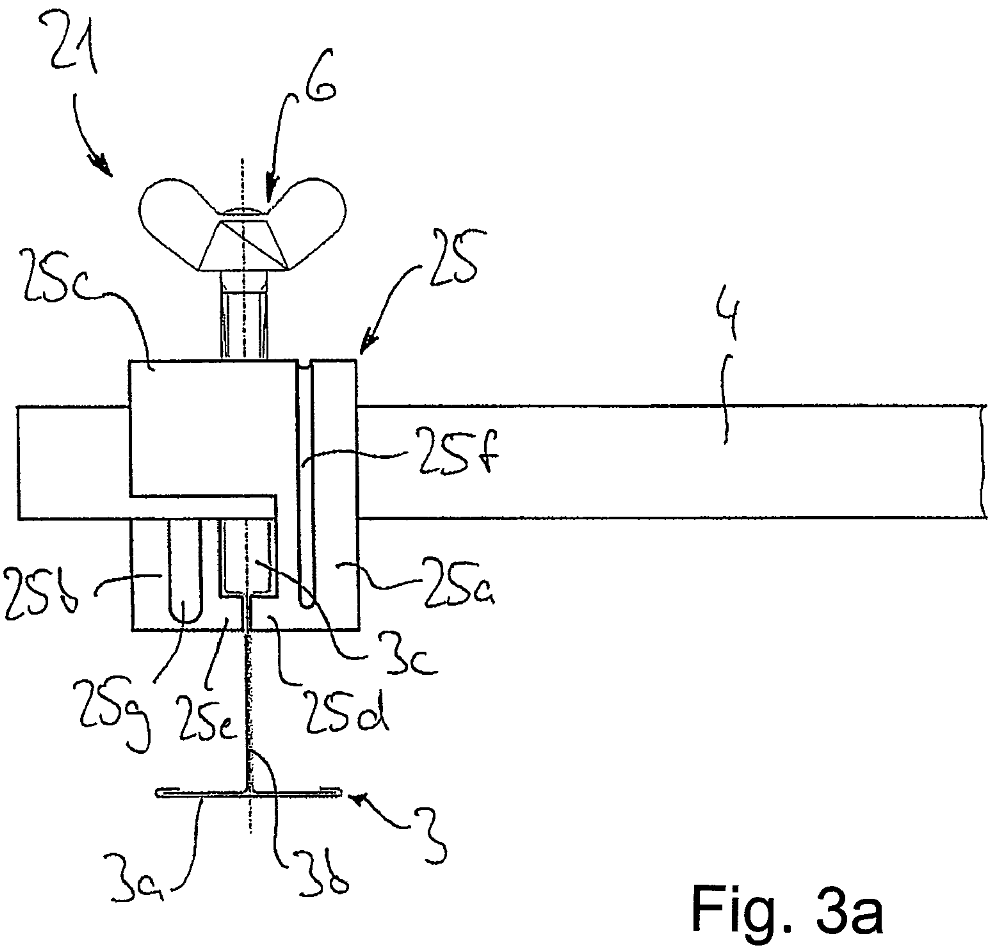
FIGS. 3*a*, 3*b* and 3*c* show a further alternative sprinkler nozzle mount according to the present invention.
Figure 3B:
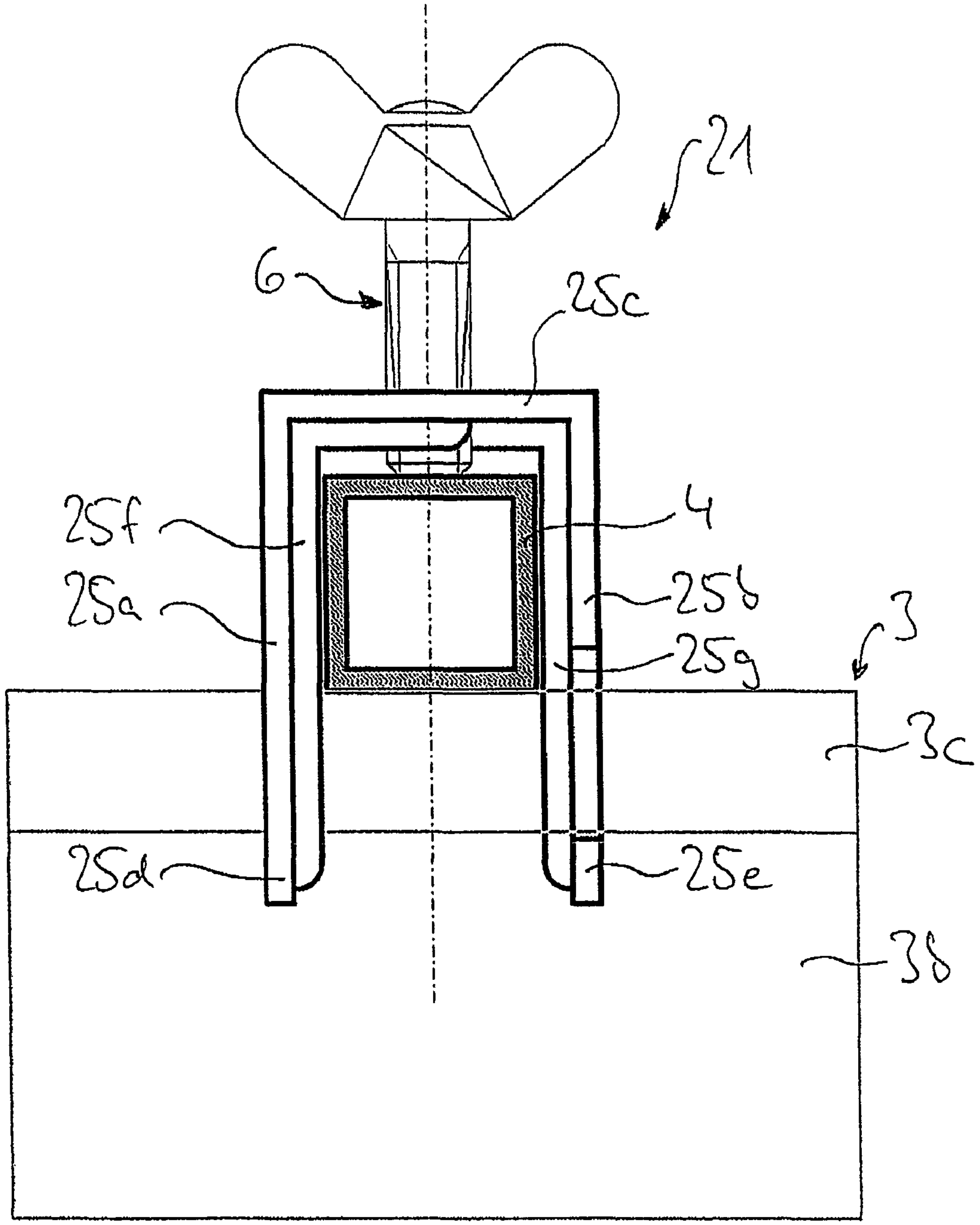
Figure 3C:
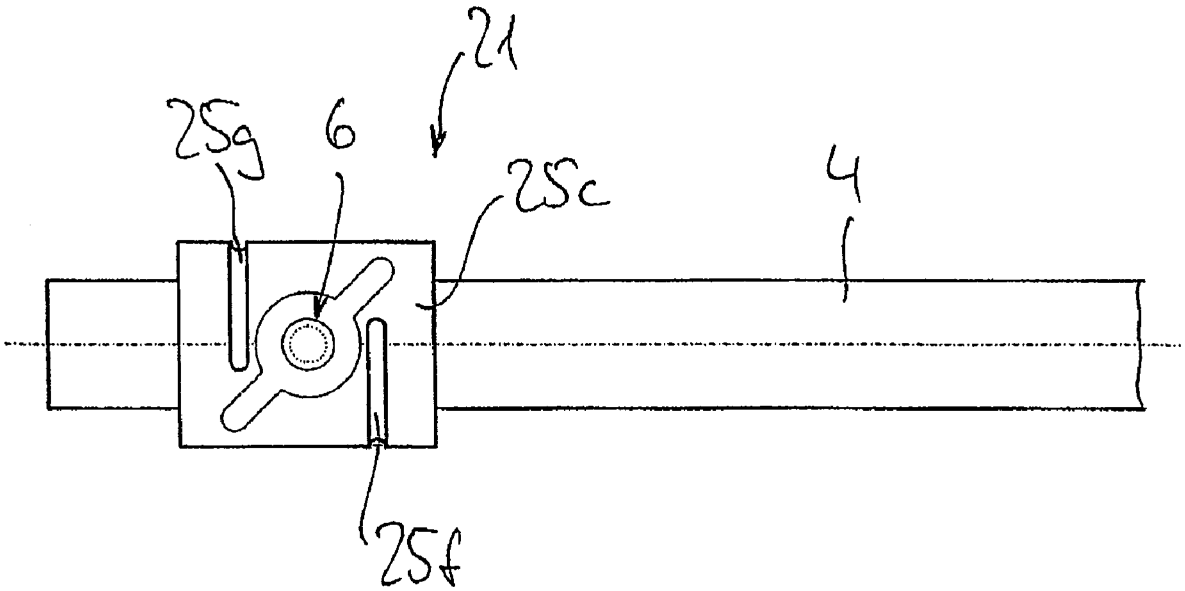

FIG. 3 shows an embodiment of a mount 21 comprising a clamp 25 which is almost identical to the embodiment from FIG. 2 in the views a), b), and c), with the single difference that bead-like, essentially vertical depressions 25*f*, 25*g* are introduced therein in the area of the clamp legs 25*a*, 25*b* and a part of the clamp base 25*c*. These bead-like depressions are used for reinforcing the rigidity of the clamp legs 25*a*, 25*b* through which the clamp 25 is pressed against the rectangular tube of the bridge 4. Otherwise, the structure and function of the clamp 25 is identical to that of the clamp 15.

Figure 4A:
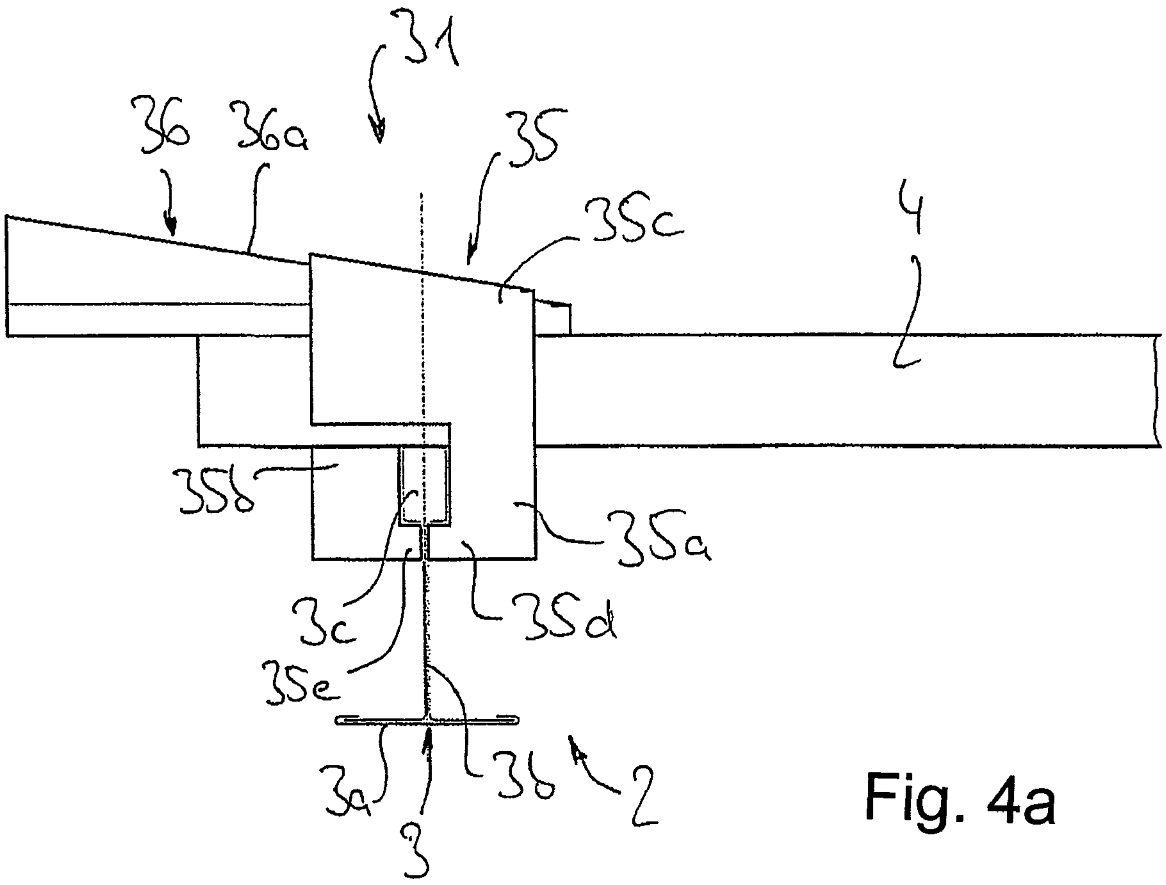
FIGS. 4*a*, 4*b* and 4*c* show a sprinkler nozzle mount embodiment having a different type of fastener than the embodiments in FIGS. 1 through 3, and FIGS. 5*a*, 5*b* and 5*c* show a device for attaching the sprinkler nozzle to the mount according to the present invention.
Figure 4B:
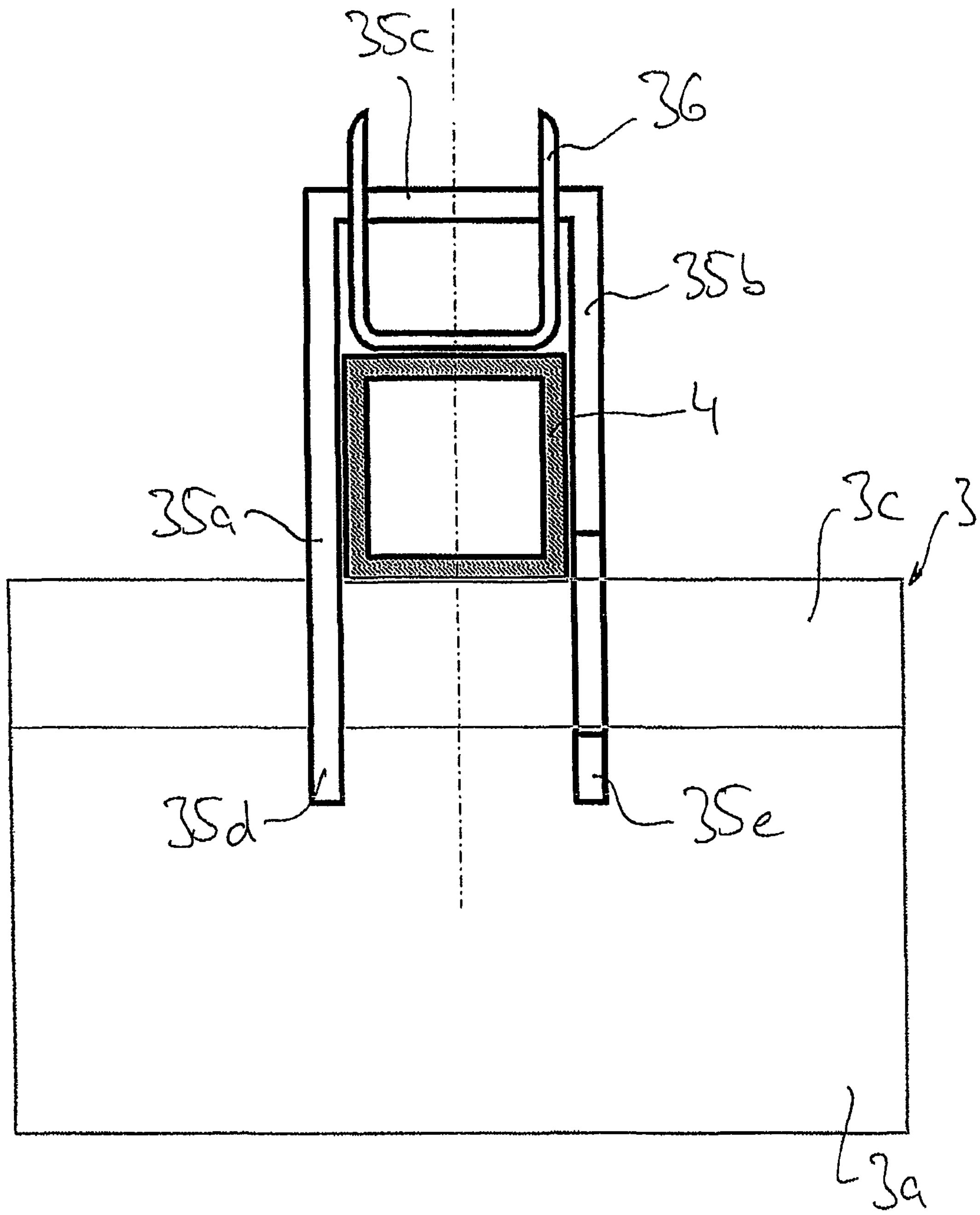
Figure 4C:
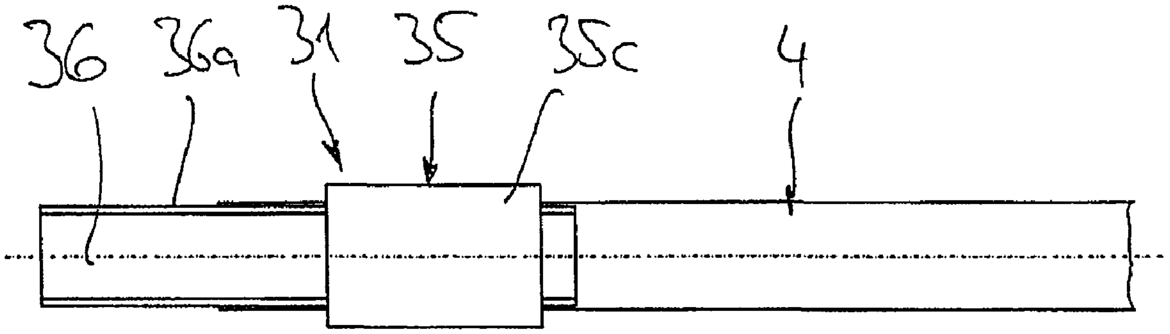

Finally, FIGS. 4*a*, 4*b* and 4*c* show a mount 31 comprising a clamp 35 which is constructed similarly to the clamp 15 and 25 from FIGS. 2 and 3, but which has a clamp base 35*c* that is not situated horizontally, but rather slightly inclined. This inclination is used for inserting a fastening wedge 36 having a correspondingly inclined top side 36*a* into the intervening space between the clamp base 35*c* and the bridge member 4, thereby clamping the bridge 4 to the T-girder 3 in the vertical direction, the free ends 35*d*, 35*e* of the clamp legs 35*a*, 35*b* again laterally contacting the T-web 3*b* and engaging underneath the T-flange 3*c*.

Figure 5A:
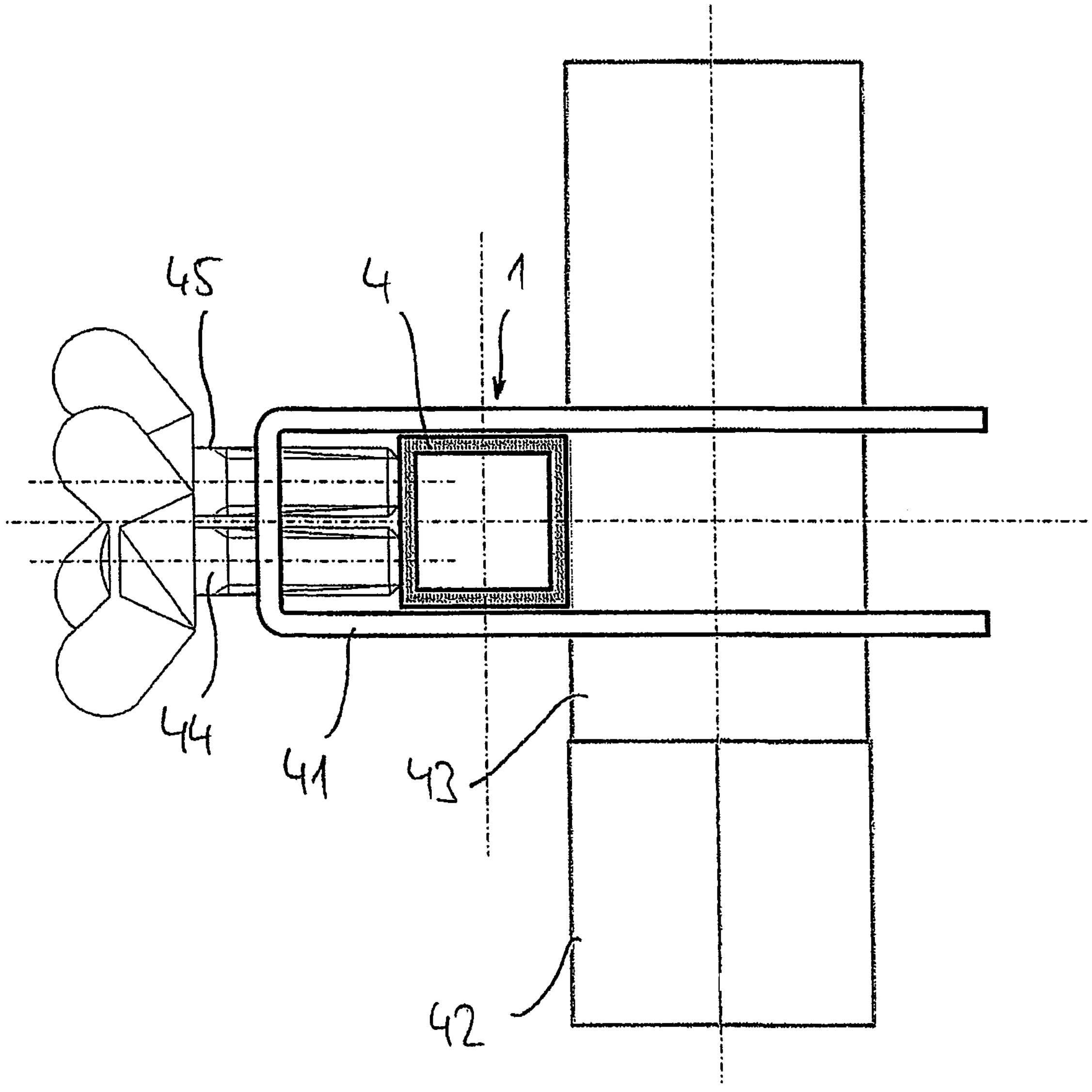
Figure 5B:
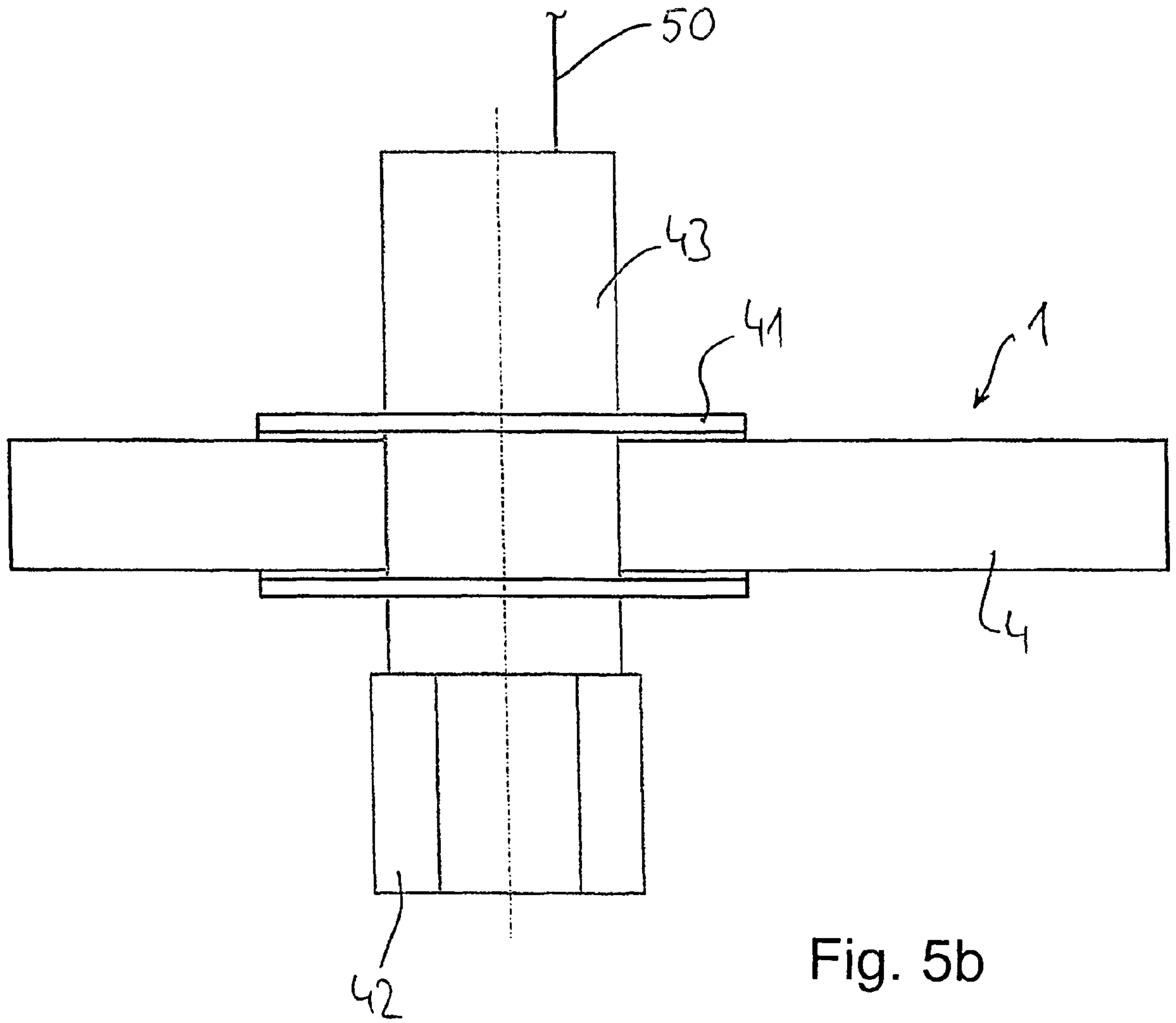
Figure 5C:
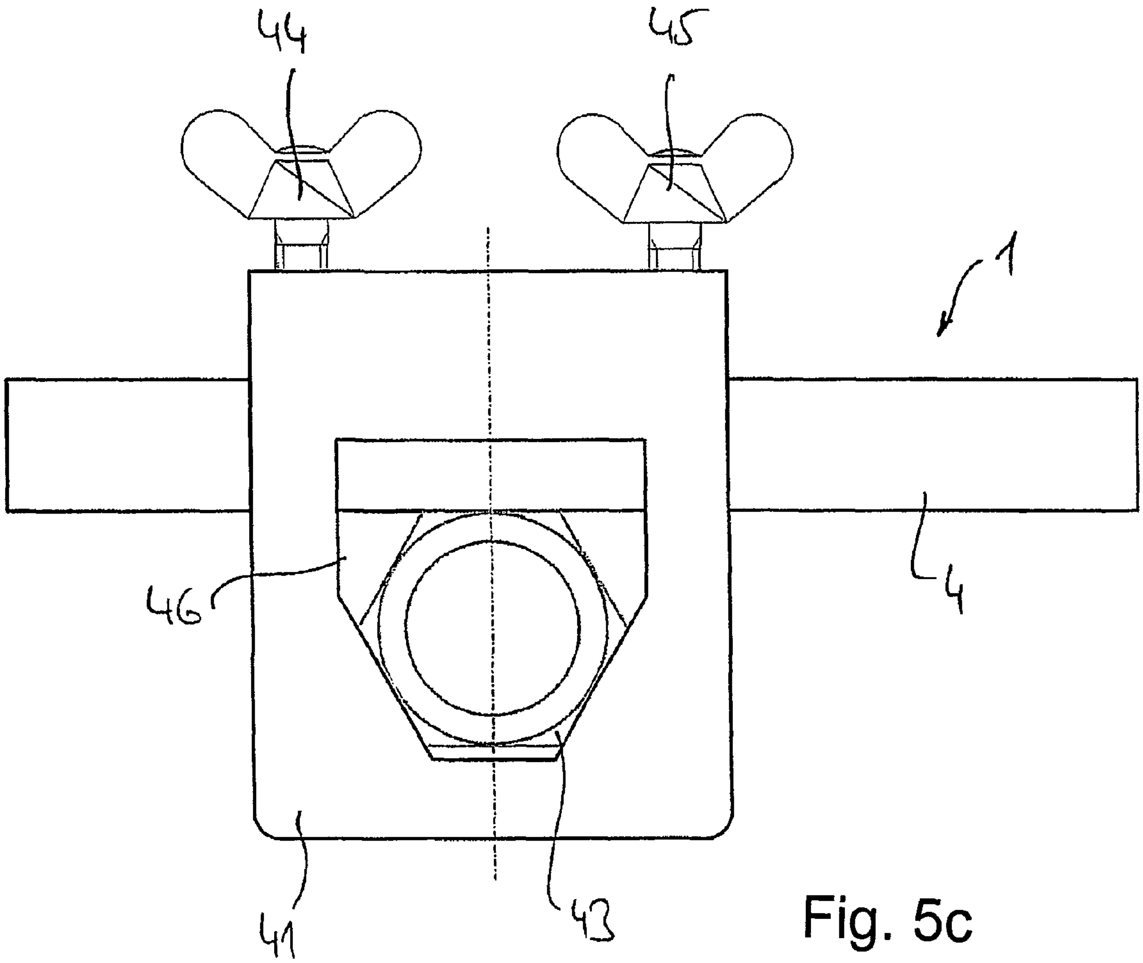

The attachment of the sprinkler nozzle to the bridge is achieved—as is shown in FIG. 5*a* in a front view, in FIG. 5*b* in a side view, and in FIG. 5*c* in a view from below—in a similarly simple way by a U-shaped clamp 41, which engages a sleeve 43 situated between hose line 50 and sprinkler nozzle 42 and clamps the sleeve against the bridge member 4 via two screws 44, 45 arranged in parallel on a base 41*c* of the clamp. If the sleeve—as shown here—is constructed as a hexagon or octagon, recesses 46 provided in U-legs 41*a*, 41*b* of the U-clamp may have similar diagonals adapted thereto, so that when the sleeve is accordingly fixed on the bridge, comparatively large torques may be absorbed without large retaining forces due to the form fit between recess and sleeve.

It is to be noted that the illustrative embodiments show only show a few variants of the clamping device according to the present invention as a part of the sprinkler nozzle mount, whose shared feature according to the present invention is that the bridge may be fixed on the girder with the aid of a single fastener, this clamping device also very simply comprising a planar sheet-metal blank or a sheet metal profile bent in a U-shape. The present invention is thus distinguished by a simple and cost-effective construction and simple handling.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A mount for situating a sprinkler nozzle of a fire extinction system in an opening of a suspended ceiling system with the sprinkler nozzle directed vertically downwardly, said mount comprising:

a bridge member to which the sprinkler nozzle is at least indirectly attached, said bridge member being disposed on top of the ceiling system extending essentially parallel thereto, and a releasable clamping device by which the bridge member is connected to at least one girder of the ceiling system, the girder having an upper portion comprising an enlarged flange, wherein the clamping device comprises a clamp which at least partially encloses both the girder and the bridge member, which the bridge member rests directly on top of the girder, said clamp comprising a fastener which urges the bridge member and the girder against one another and thereby fixes the bridge member and girder to one another in a form-fitting manner, wherein the clamp comprises two clamp legs extending generally parallel to one another and a clamp base connecting the two clamp legs, said clamp base carries the fastener, said clamp legs enclose the bridge member and have hook-shaped free ends which are deflected toward one another, and the hook-shaped free ends of the legs engage underneath the enlarged flange of the girder, wherein the clamp legs have a minimal distance with respect to each other at said free ends that still exceeds the width of the enlarged flange of the girder to provide for rotating the clamp legs relative to the girder, and wherein the hook-shaped free ends of the clamp legs are spaced apart a horizontal distance greater than the width of the enlarged flange of the girder.

2. A mount according to claim 1, wherein the bridge member comprises a rectangular tube.

3. A mount at least according to claim 1, wherein the clamp encloses or engages underneath said enlarged flange.

4. A mount according to claim 3, wherein the girder is an inverted T-girder comprising a horizontal base and a T-web extending vertically upward from said horizontal base, said flange is formed at an upper portion of said T-web and has a width greater than the width of the T-web, and said clamp engages underneath said flange.

5. A mount according to claim 1, wherein the bridge member and the girder are situated in substantially parallel horizontal planes and are oriented substantially perpendicular to each other.

6. A mount according to claim 1, wherein said fastener comprises a manually turnable screw.

7. A mount according to claim 1, wherein said fastener comprises a clamping wedge.

8. A mount according to claim 1, wherein the sprinkler nozzle is connected to a flexible hose line by a sleeve.

9. A device for attaching a sprinkler nozzle to a sprinkler mount according to claim 1, said nozzle being connected via a flexible hose line to a fire extinguishing system, said device comprising a sleeve situated between the hose line and the sprinkler nozzle, and a clamp which encloses the sleeve on one side and the mount on the other side.

10. A device according to claim 9, wherein the clamp has a U-shaped construction comprising two legs connected by a leg base, each leg having a recess for receiving the sleeve, and said leg base carrying at least one fastener for applying a clamping force to the mount.

11. A device according to claim 9, wherein said fastener is one of a pair of parallel screws which apply a clamping force to the mount and clamp the mount against the sleeve.

12. A device according to claim 9, wherein the sleeve is constructed as a hexagon or an octagon.

* * * * *